United States Patent
Bae et al.

(10) Patent No.: US 12,420,362 B2
(45) Date of Patent: Sep. 23, 2025

(54) SECONDARY BATTERY AND ULTRASONIC WELDING DEVICE AND WELDING METHOD FOR SECONDARY BATTERY

(71) Applicant: LG Energy Solution, Ltd., Seoul (KR)

(72) Inventors: Sang Ho Bae, Daejeon (KR); Hun Bum Jung, Daejeon (KR); Jin Yong Lee, Daejeon (KR); Ji Hun Hwang, Daejeon (KR); Cha Hun Ku, Daejeon (KR); Su Taek Jung, Daejeon (KR); Chang Min Han, Daejeon (KR); Jae Hwa Choi, Daejeon (KR); Young Seok Baek, Daejeon (KR); Jeong Yeon Kim, Daejeon (KR); Jung Joo Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 500 days.

(21) Appl. No.: 17/921,287

(22) PCT Filed: Jun. 25, 2021

(86) PCT No.: PCT/KR2021/008042
§ 371 (c)(1),
(2) Date: Oct. 25, 2022

(87) PCT Pub. No.: WO2022/014895
PCT Pub. Date: Jan. 20, 2022

(65) Prior Publication Data
US 2023/0182239 A1    Jun. 15, 2023

(30) Foreign Application Priority Data

Jul. 17, 2020 (KR) .......... 10-2020-0089211
Jun. 22, 2021 (KR) .......... 10-2021-0081002

(51) Int. Cl.
*H01M 50/528* (2021.01)
*B23K 20/10* (2006.01)
(Continued)

(52) U.S. Cl.
CPC ........ *B23K 37/0452* (2013.01); *B23K 20/106* (2013.01); *H01M 50/528* (2021.01); *B23K 2101/38* (2018.08)

(58) Field of Classification Search
CPC ............. H01M 50/528; H01M 50/516; H01M 50/517; H01M 50/529; H01M 50/531; B23K 37/0452; B23K 2101/38
See application file for complete search history.

(56) References Cited

U.S. PATENT DOCUMENTS

| 8,628,874 B2 * | 1/2014 | Kim ................ H01M 50/536 |
| | | 429/153 |
| 11,075,374 B2 * | 7/2021 | Mino ............... H01M 50/536 |

(Continued)

FOREIGN PATENT DOCUMENTS

| CN | 108393573 A | 8/2018 |
| CN | 209157385 U | 7/2019 |

(Continued)

OTHER PUBLICATIONS

International Search Report for Application No. PCT/KR2021/008042 mailed Sep. 14, 2021, 2 pages.
(Continued)

*Primary Examiner* — Raymond Alejandro
(74) *Attorney, Agent, or Firm* — Lerner David LLP (57) ABSTRACT

An ultrasonic welding device includes an anvil provided so that an overlapping surface of an electrode tab and an electrode lead, which are provided in an electrode assembly, are configured to be disposed thereon; a horn configured to weld the overlapping surface disposed on the anvil; and an
(Continued)

inspection member configured to inspect a horizontal level of an opposing member with respect to the overlapping surface, based on an overlapping surface horizontal value that is a horizontal value of the overlapping surface with respect to a predetermined reference surface and an opposing horizontal value that is a horizontal value of the opposing member, which is one of a welding part of the horn configured to face the overlapping surface and a disposing part of the anvil, on which the overlapping surface is configured to be disposed, with respect to the predetermined reference surface.

7 Claims, 10 Drawing Sheets

(51) Int. Cl.
*B23K 37/04* (2006.01)
*B23K 101/38* (2006.01)

(56) References Cited

U.S. PATENT DOCUMENTS

| | | | |
|---|---|---|---|
| 11,387,526 B2 * | 7/2022 | Ban | B23K 20/10 |
| 2010/0224327 A1 | 9/2010 | Jalbert et al. | |
| 2012/0158168 A1 | 6/2012 | Khakhalev | |

FOREIGN PATENT DOCUMENTS

| | | |
|---|---|---|
| DE | 102017126303 A1 | 5/2019 |
| JP | 2003197685 A | 7/2003 |
| JP | 2010201481 A | 9/2010 |
| JP | 2014226699 A | 12/2014 |
| JP | 6232667 B2 | 11/2017 |
| JP | 2020082164 A | 6/2020 |
| KR | 101284273 B1 | 7/2013 |
| KR | 101317167 B1 | 10/2013 |
| KR | 101600466 B1 | 3/2016 |
| KR | 101773644 B1 | 8/2017 |
| KR | 20170105367 A | 9/2017 |
| KR | 102072853 B1 | 2/2020 |

OTHER PUBLICATIONS

Search Report dated Jun. 18, 2024 from the Office Action for Chinese Application No. 202180028817.8 , Issued Jun. 22, 2024, pp. 1-2. [See p. 1, categorizing the cited references].
Extended European Search Report including Written Opinion for Application No. 21842075.0 dated Dec. 18, 2023, pp. 1-9.

* cited by examiner

SECONDARY BATTERY AND ULTRASONIC WELDING DEVICE AND WELDING METHOD FOR SECONDARY BATTERY

CROSS-REFERENCE TO RELATED APPLICATIONS

The present application is a national phase entry under 35 U.S.C. § 371 of International Application No. PCT/KR2021/008042, filed on Jun. 25, 2021, published in Korean, which claims the benefit of the priority of Korean Patent Application Nos. 10-2020-0089211, filed on Jul. 17, 2020, and 10-2021-0081002, filed on Jun. 22, 2021, which are hereby incorporated by reference in their entirety.

TECHNICAL FIELD

The present invention relates to a secondary battery, and an ultrasonic welding device and method for the secondary battery, and more particularly, to a secondary battery in which an overlapping surface of an electrode tab and an electrode lead is uniformly welded, and an ultrasonic welding device and welding method for the secondary battery.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

The secondary batteries are classified into a can type secondary battery, in which an electrode assembly is embedded in a metal can, and a pouch type secondary battery in which an electrode assembly is embedded in a pouch. Also, the pouch type secondary battery comprises an electrode assembly, an electrode lead coupled to an electrode tab of the electrode assembly, and a pouch accommodating the electrode assembly in a state in which a front end of the electrode lead is drawn out.

The electrode tab and the electrode lead of the electrode assembly are coupled through welding. Here, an ultrasonic welding device is used.

The ultrasonic welding device comprises an anvil on which an overlapping surface of the electrode tab and the electrode lead is disposed, and a horn that applies ultrasonic waves to the overlapping surface, which is disposed on the anvil, to weld the overlapping surface.

However, in the ultrasonic welding device has a problem in which, when the anvil and the horn are not disposed horizontally with respect to the overlapping surface, the entire overlapping surface is not uniformly welded to cause welding defects.

In more detail, in the ultrasonic welding device according to the related art, when the anvil and the horn are not disposed horizontally with respect to the overlapping surface, welding energy may not be uniformly transmitted to the entire overlapping surface to cause the welding defects.

DISCLOSURE OF THE INVENTION

Technical Problem

An object of the present invention for solving the above problems is provide a secondary battery, in which horizontal levels of an anvil and a horn are adjusted to be disposed horizontally with respect to an overlapping surface of an electrode tab and an electrode lead to uniformly (equally) transmit welding energy to the entire overlapping surface of the electrode tab and the electrode lead, thereby uniformly welding the entire overlapping surface, resulting in improving welding quality, and an ultrasonic welding device and welding method for the secondary battery.

Technical Solution

An ultrasonic welding device according to the present invention for achieving the above object comprises: an anvil provided so that an overlapping surface of an electrode tab and an electrode lead, which are provided in an electrode assembly, are configured to be disposed thereon; a horn configured to weld the overlapping surface disposed on the anvil; and an inspection member configured to inspect a horizontal level of an opposing member with respect to the overlapping surface, based on an overlapping surface horizontal value that is a horizontal value of the overlapping surface with respect to a predetermined reference surface and an opposing horizontal value that is a horizontal value of the opposing member, which is one of a welding part of the horn configured to face the overlapping surface and a disposing part of the anvil, on which the overlapping surface is configured to be disposed, with respect to the predetermined reference surface.

When the horizontal level is determined as being within a predetermined range by the inspection member, the horn may be provided to apply ultrasonic waves to the overlapping surface while supporting the welding part of the horn on the overlapping surface.

The ultrasonic welding device may further comprise: an overlapping surface measuring member configured to measure the overlapping surface horizontal value; and an opposing measuring member configured to measure the opposing horizontal value.

The ultrasonic welding device may further comprise an angle adjusting member configured to adjust an angle of the opposing member by a difference value between the overlapping surface horizontal value and the opposing horizontal value.

The angle adjusting member may be configured to adjust the angle of the opposing member by the difference value between the overlapping surface horizontal value and the opposing horizontal value when the inspection member determines that the horizontal level is outside of the predetermined range.

The overlapping surface horizontal value may comprise an inclination angle of the overlapping surface in a full-length direction and an inclination angle of the overlapping surface in a full-width direction in a state in which the predetermined reference surface is set to an angle of 0°, the opposing horizontal value may comprise an inclination angle of the opposing member in a full-length direction and an inclination angle of the opposing member in a full-width direction in a state in which the predetermined reference surface is set to an angle of 0°, and the inspection member may be provided to compare the inclination angle of the overlapping surface in the full-length direction to the inclination angle of the opposing member in the full-length direction and compare the inclination angle of the overlapping surface in the full-width direction to the inclination angle of the opposing member in the full-width direction.

The predetermined range may be angles of 0° to 0.30°.

An ultrasonic welding method for a secondary battery according to the present invention comprises: a process (a) of disposing an overlapping surface of an electrode tab and an electrode lead, which are provided in an electrode assembly, on an anvil; a process (b) of disposing a horn for welding the overlapping surface on the anvil; and a process (c) of inspecting a horizontal level of an opposing member with respect to the overlapping surface, based on an overlapping surface horizontal value that is a horizontal value of the overlapping surface with respect to a predetermined reference surface and an opposing horizontal value that is a horizontal value of the opposing member, which is one of a welding part of the horn facing the overlapping surface and a disposing part of the anvil, on which the overlapping surface is disposed, with respect to the predetermined reference surface.

The process (c) may further comprise a process of applying ultrasonic waves in a state of supporting the welding part of the horn on the overlapping surface when the horizontal level is determined as being within a predetermined range.

The process (c) may further comprise a process of adjusting an angle of the opposing member by a difference value between the overlapping surface horizontal value and the opposing horizontal value when the inspection member determines that the horizontal level is out of the predetermined range.

The process (a) may further comprise a process of measuring the overlapping surface horizontal value.

The process (b) may further comprise a process of measuring the opposing horizontal value.

The predetermined range may be angles of 0° to 0.30°.

A secondary battery according to the present invention comprises an electrode assembly in which an electrode tab and an electrode lead are provided, wherein an overlapping surface bonded by ultrasonic welding is provided on a portion at which the electrode tab and the electrode lead overlap each other, and the overlapping surface has a same overall bonding force in a full-length direction and a full-width direction of the overlapping surface.

Advantageous Effects

The ultrasonic welding device for the secondary battery of the present invention comprises the inspection member that inspects the horizontal levels of the anvil and the horn with respect to the overlapping surface of the electrode tab and the electrode lead. That is, the inspection member may inspect the horizontal level of the opposing member with respect to the overlapping surface, based on the overlapping surface horizontal value, which is the horizontal value of the overlapping surface with respect to the predetermined reference surface, and the opposing horizontal value, which is the horizontal value with respect to the reference surface of the opposing member that is one of the welding part of the horn facing the overlapping surface and the disposing part of the anvil on which the overlapping surface is disposed. Therefore, it may be inspected whether the anvil and the horn uniformly press the entire overlapping surface, and as a result, it may be inspected whether the defects occur.

In addition, the ultrasonic welding device for the secondary battery according to the present invention may comprises an angle adjusting member for correcting the angles of the anvil and the horn with respect to the overlapping surface. That is, the angle adjusting member may be configured to adjust the angle of the opposing member by the difference value between the overlapping surface horizontal value and the opposing horizontal value when the inspection member determines that the horizontal level is out of the predetermined normal range. Therefore, the anvil and the horn may uniformly press the entire overlapping surface, and as a result, the bonding force of the entire overlapping surface may be uniform to prevent the defects from occurring.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Secondary Battery According to First Embodiment of the Present Invention

Figure 1:
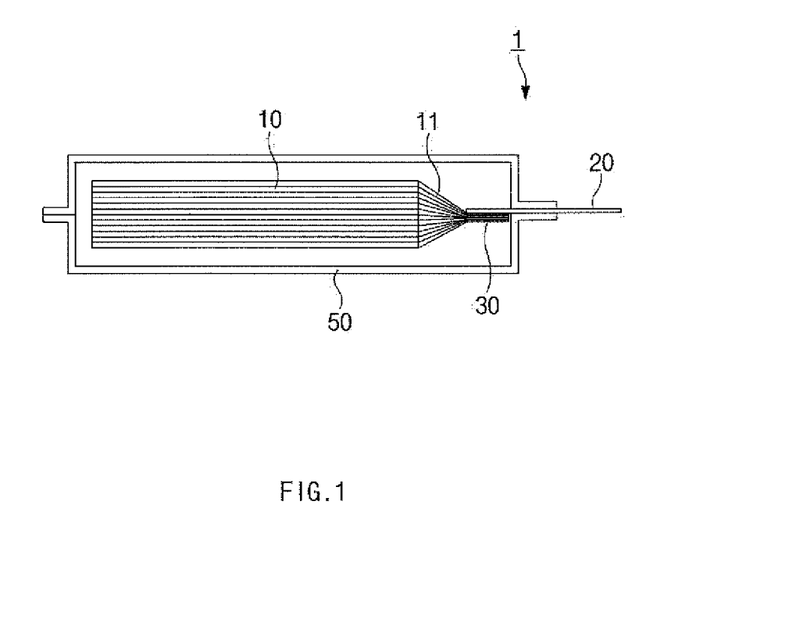
FIG. 1 is a cross-sectional view of a secondary battery according to a first embodiment of the present invention.

As illustrated in FIG. 1, a secondary battery 1 according to a first embodiment of the present invention comprises an electrode assembly 10 in which an electrode tab 11 is provided, an electrode lead 20 coupled to the electrode tab 11, and a pouch 50 accommodating the electrode assembly 10 in a state in which a front end of the electrode lead 20 is withdrawn to the outside.

Here, the electrode tab 11 and the electrode lead 20 are disposed to partially overlap each other, and then, the overlapping portion of the electrode tab 11 and the electrode lead 20 is ultrasonic-welded to bond the electrode tab 11 to the electrode lead 20. That is, an overlapping surface 30 coupled by the ultrasonic welding is provided at the overlapping portion of the electrode tab and the electrode lead. Here, the ultrasonic welding device for the secondary battery according to the first embodiment of the present invention is used.

Particularly, since the overlapping surface 30 may be ultrasonic-welded through the ultrasonic welding device for the secondary battery according to a second embodiment of the present invention, overall bonding strength in a full-length direction (a left and right direction when viewed in FIG. 1) of the overlapping surface 30 and the overall bonding force in a full-width direction (a front and rear direction when viewed in FIG. 1) may be uniformly (equally) provided to improve welding quality.

Hereinafter, an ultrasonic welding device for a secondary battery according to the second embodiment of the present invention will be described in detail.

Ultrasonic Welding Device for Secondary Battery According to Second Embodiment of the Present Invention As illustrated in FIGS. 2 to 6, an ultrasonic welding device 100 for a secondary battery according to a second embodiment of the present invention comprises an anvil 110 on which an overlapping surface 30 of an electrode tab 11 and an electrode lead 20, which are provided in the electrode assembly 10, is disposed, and a horn 120 provided to weld the overlapping surface 30 disposed on the anvil 110.

Figure 2:
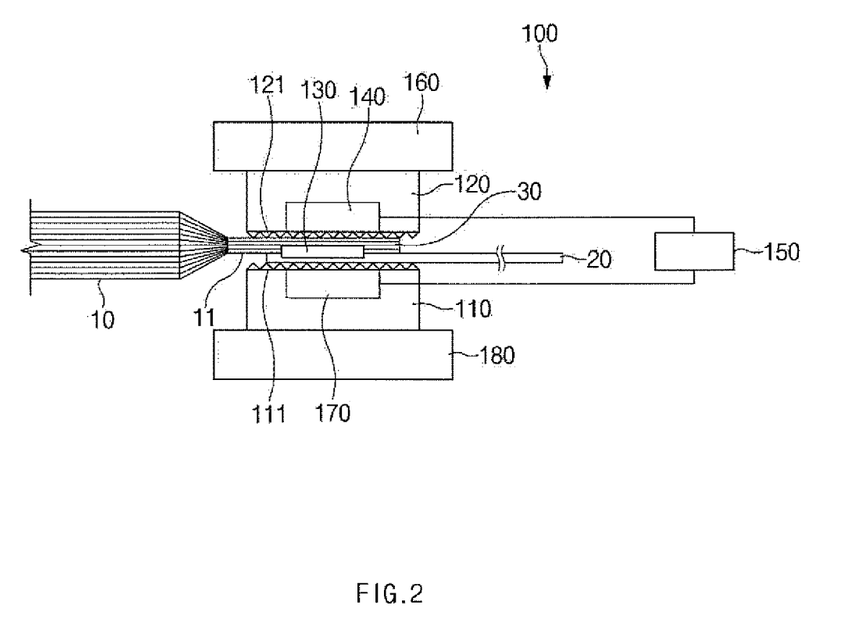
FIG. 2 is a side view illustrating an ultrasonic welding device for a secondary battery according to a second embodiment of the present invention.

That is, in the ultrasonic welding device 100 for the secondary battery according to the second embodiment of the present invention, in a state in which the anvil 110 and the horn 120 press-fit the overlapping surface 30 of the electrode tab 11 and the electrode lead 20, the overlapping surface 30 may be ultrasonic-welded through the horn 120 to connect and couple the electrode tab 11 to the electrode lead 20.

In the ultrasonic welding device 100 for the secondary battery according to the second embodiment of the present invention, when a welding part 121 of the horn 120 or a disposing part 111 of the anvil 110, on which the overlapping surface is disposed, has a horizontal level different from that of the overlapping surface 30, the entire overlapping surface 30 may not be uniformly press-fitted through the anvil 110 and the horn 120, and thus, a difference in welding energy applied to the entire overlapping surface 30 may occur to cause welding defects.

In order to solve the above problems, the ultrasonic welding device 100 for the secondary battery according to the second embodiment of the present invention comprises an inspection member that inspects the horizontal level of the disposing part 111 of the anvil or the welding part 121 of the horn 120 with respect to the overlapping surface 30. The inspection member 150 may inspect whether the entire overlapping surface 30 is uniformly press-fitted through the anvil 110 and the horn 120, to inspect whether the welding defects occur.

That is, the inspection member 150 may inspect the horizontal level of an opposing member with respect to the overlapping surface 30, based on an overlapping surface horizontal value, which is a horizontal value of the overlapping surface 30 with respect to a predetermined reference surface 40, and an opposing horizontal value, which is a horizontal value with respect to a reference surface of an opposing member that is one of the welding part 121 of the horn 120 and the disposing part 111 of the anvil 110 on which the overlapping surface is disposed.

Here, when it is determined that the horizontal level is within a predetermined normal range by the inspection member 150, the horn 120 is provided to apply ultrasonic waves in a state in which the welding part 121 of the horn 120 is supported on the overlapping surface 30, and thus, welding energy applied to the entire overlapping surface 30 may be uniform to improve welding quality due to the uniform welding on the entire overlapping surface.

Thus, the ultrasonic welding device 100 for the secondary battery according to the second embodiment of the present invention may comprise the inspection member to detect the horizontal level of the disposing part 11 of the anvil 110 or the welding part 121 of the horn 120 with respect to the overlapping surface 30, thereby inspecting whether the entire overlapping surface 30 is uniformly press-fitted, and as a result, inspecting whether welding defects occur.

The ultrasonic welding device 100 for the secondary battery according to the second embodiment of the present invention comprises an overlapping surface measuring member 130, which measures an overlapping surface horizontal value that is a horizontal value of the overlapping surface 30 with respect to the predetermined reference surface 40, and an opposing measuring member, which measures an opposing horizontal value that is a horizontal value of the opposing member, which is one of the welding part 121 of the horn 120, which faces the overlapping surface 30, and the disposing part 111 of the anvil 110 on which the overlapping surface 30 is disposed, with respect to the reference surface 40.

The overlapping surface measuring member 130 is provided close to the overlapping surface 30 of the electrode tab 11 and the electrode lead 20 to measure the horizontal value of the overlapping surface 30 based on the reference surface 40. That is, the overlapping surface measuring member 130 calculates the overlapping surface horizontal value of how many degrees the overlapping surface 30 has an inclination angle with respect to the reference surface 40.

On the other hand, the overlapping surface measuring member 130 is provided with at least three places on the overlapping surface 30, and thus, the overlapping surface measuring member 130 may measure horizontal values at the three or more places of the overlapping surface 30 to calculate the overlapping surface horizontal value as an average of the measured horizontal values as the three or more places.

The horizontal value of the overlapping surface comprises an inclination angle A1° of the overlapping surface 30 in the full-length direction and an inclination angle A2° of the overlapping surface 30 in the full-width direction in a state in which the reference surface is set to an angle of 0°. That is, the overlapping surface measuring member 130 measures the overlapping surface horizontal value comprising the inclination angle A1° of the overlapping surface in the full-length direction and the inclination angle A2° of the overlapping surface in the full-width direction with respect to the reference surface 40.

The opposing measuring member measures an opposing horizontal value that is a horizontal value of the opposing member, which is one of the welding part 121 of the horn 120 facing the overlapping surface 30 and the disposing part 111 of the anvil 110 on which the overlapping surface 30 is disposed, with respect to the reference surface 40. That is, the opposing measuring member measures the opposing horizontal value to determine how many degrees the opposing member has an inclination angle with respect to the overlapping surface.

The opposing horizontal value comprises an inclination angle of the opposing member in the full-length direction and an inclination angle of the opposing member in the full-width direction in a state in which the reference surface or the overlapping surface is set to an angle of 0°. Accordingly, the inspection member is provided to compare the inclination angle of the overlapping surface in the full-length direction to the inclination angle of the opposing member in the full-length direction and is provided to compare the inclination angle of the overlapping surface in the full-width direction to the inclination angle of the opposing member in the full-width direction.

For example, the opposing member comprises a horn measuring member 140 and an anvil measuring member 170.

Figure 3:
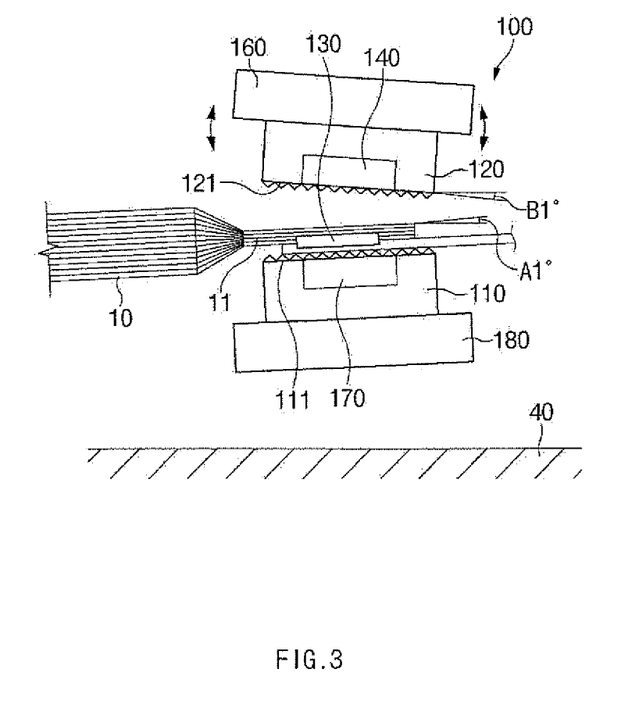
FIG. 3 is a side view illustrating a horn measuring member and a horn angle adjusting member of the ultrasonic welding device for the secondary battery according to the second embodiment of the present invention.
Figure 4:
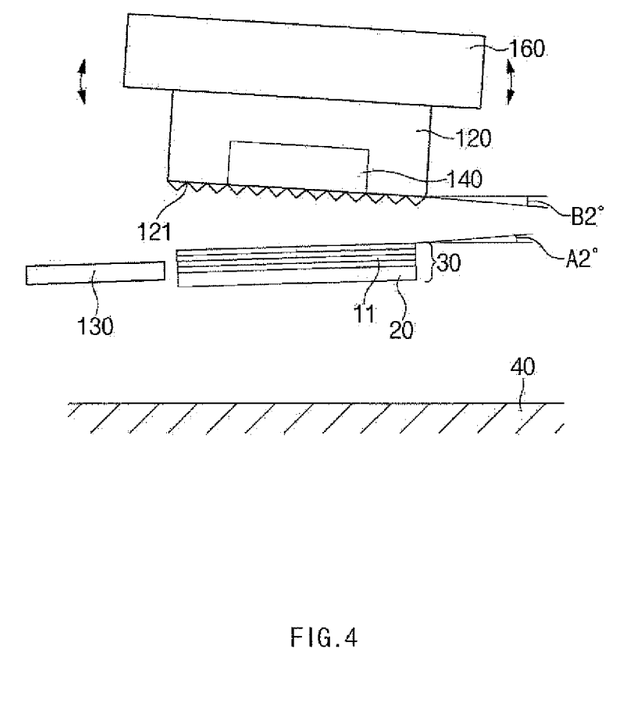
FIG. 4 is a front view of FIG. 3.

The horn measuring member 140 measures a horizontal value of the welding part of the horn 120 facing the overlapping surface 30 with respect to the reference surface 40. The horizontal value of the welding part of the horn comprises an inclination angle B1° of the horn 120 in the full-length direction and an inclination angle B2° of the horn 120 in the full-width direction in a state in which the reference surface 40 is set to an angle of 0°. That is, the horn measuring member 140 measures a horizontal value of the welding part of the horn, which comprises the inclination angle B1° of the horn 120 in the full-length direction and an inclination angle B2° of the horn 120 in the full-width direction with respect to the reference surface 40.

That is, the inspection member 150 compares the horizontal value of the overlapping surface, which is measured by the overlapping surface measuring member 130, to the horizontal value of the welding part, which is measured by the horn measuring member 140. Then, when it is determined that the difference value is within a normal range, it is determined as being normal, and on the other hand, when it is determined that the difference value is out of the normal range, it is determined as being defective.

For example, the inspection member 150 compares the inclination angle A1° of the overlapping surface 30 in the full-length direction to the inclination angle B1° of the horn 120 in the full-width direction to calculate a difference value of the horn in the full-length direction and also compares the inclination angle A2° of the overlapping surface 30 in the full-width direction to the inclination angle B2° of the horn 120 in the full-width direction to calculate a difference value of the horn in the full-width direction.

Therefore, the inspection member 150 determines that both the difference value in the full-length direction of the horn and the difference value in the full-width direction of the horn are within the normal range, and if any one is determined as out of the normal range, it is determined as being defective.

Figure 5:
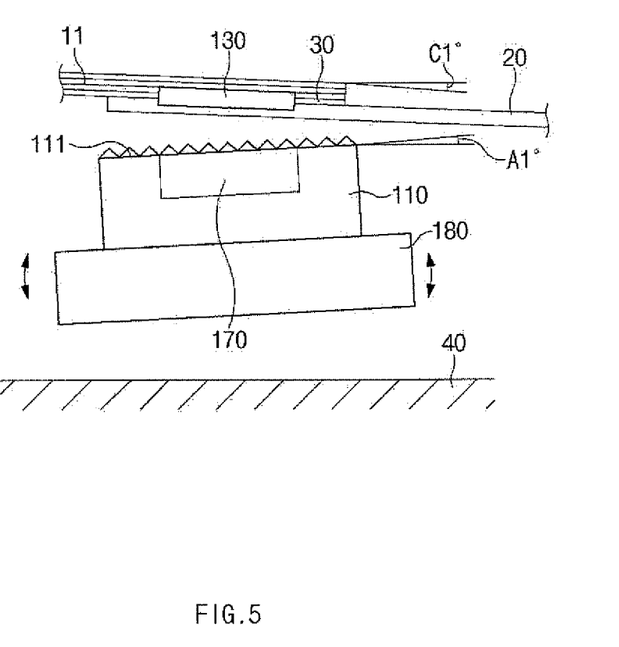
FIG. 5 is a side view illustrating an anvil measuring member and an anvil angle adjusting member of the ultrasonic welding device for the secondary battery according to the second embodiment of the present invention.
Figure 6:
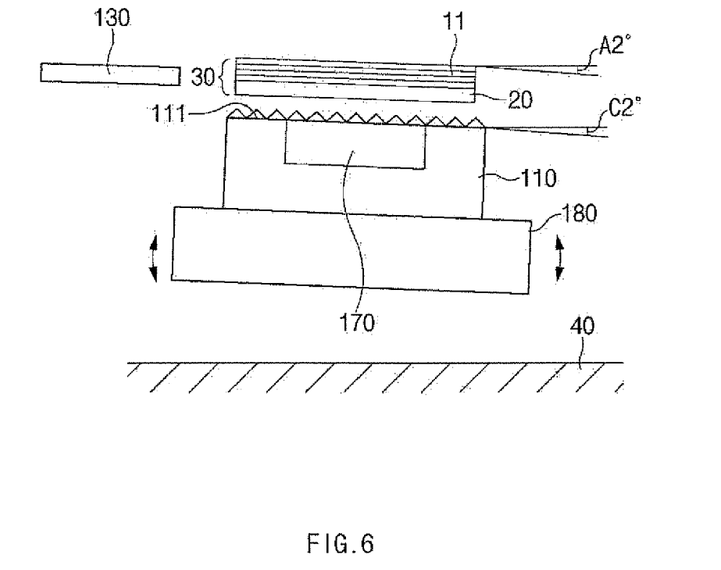
FIG. 6 is a front view of FIG. 5.

The anvil measuring member 170 is provided in the anvil 110 to measure the horizontal value of the disposing part 111 of the anvil 110 based on the reference surface 40.

As an example, the horizontal value of the arrangement comprises an inclination angle C1° of the anvil 110 in the full-length direction and an inclination angle C2° of the anvil 110 in the full-width direction in a state in which the reference surface 40 is set to an angle of 0°. That is, the anvil measuring member 170 measures the inclination angle C1° of the anvil 110 in the full-length direction and the inclination angle C2° of the anvil 110 in the full-width direction with respect to the reference surface 40.

As described above, when the horizontal value of the disposing part is measured by the anvil measuring member, the inspection member 150 compares the horizontal value of the disposing part of the anvil 110, which is measured by the anvil measuring member 170, to the horizontal value of the overlapping surface, which is measured by the overlapping surface measuring member 130. Then, when it is determined that the difference value is within a normal range, it is determined as being normal, and on the other hand, when it is determined that the difference value is out of the normal range, it is determined as being defective.

Here, the inspection member 150 compares the inclination angle A1° of the overlapping surface 30 in the full-length direction to the inclination angle C1° of the anvil 110 in the full-width direction to calculate a difference value of the anvil in the full-length direction and also compares the inclination angle A2° of the overlapping surface 30 in the full-width direction to the inclination angle C2° of the anvil 110 in the full-width direction to calculate a difference value of the anvil in the full-width direction.

Therefore, the inspection member 150 determines that both the difference value in the full-length direction of the anvil and the difference value in the full-width direction of the anvil are within the normal range, and if any one is determined as being out of the normal range, it is determined as being defective.

The ultrasonic welding device 100 for the secondary battery according to the second embodiment of the present invention, which has the above-described configuration, may comprise the overlapping surface measuring member 130 and the opposing measuring member to accurately confirm a horizontal level of each of the horn 120 and the anvil with respect to the overlapping surface, thereby accurately confirming possibility of occurrence of welding defects.

Here, the reference surface 40 may be the ground or a support surface of a worktable on which the ultrasonic welding device is installed.

The ultrasonic welding device 100 for the secondary battery according to the second embodiment of the present invention further comprises an angle adjusting member that adjusts an angle of the opposing member by a difference value between the overlapping surface horizontal value and the opposing horizontal value when the horizontal level is determined as being defective.

That is, the angle adjusting member may adjust an angle of the opposing member by a difference value between the overlapping surface horizontal value and the opposing horizontal value when the horizontal level is determined as being out of a predetermined normal range through the inspection member 150. Thus, the horizontal level of the opposing member with respect to the overlapping surface 30 may be adjusted to be disposed within the normal range.

For example, the angle adjusting member comprises a horn angle adjusting member 160 and an anvil angle adjusting member 180.

When determined as being defective by the inspection member 150, the horn angle adjusting member 160 allows the horn 120 to rotate in a left and right or a front and rear direction by a difference value obtained by subtracting the horizontal value of the overlapping surface and the horizontal value of the welding part of the horn 120. Thus, the horizontal value of the overlapping surface and the horizontal value of the welding part of the horn 120 may be disposed to match each other with respect to the reference surface.

When determined as being defective by the inspection member 150, the anvil angle adjusting member 180 allows the anvil 110 to rotate in the left and right or the front and rear direction by a difference value obtained by subtracting the horizontal value of the overlapping surface and the horizontal value of the disposing part of the anvil 110, thereby adjusting the horizontal level of the disposing part of the anvil 110. Thus, the horizontal value of the overlapping surface and the horizontal value of the disposing part may be disposed to match each other with respect to the reference surface.

The normal range may be less than 0.30°, preferably less than 0.075°.

Therefore, the ultrasonic welding device 100 for the secondary battery according to the second embodiment of the present invention may comprise the angle adjusting member so that the horizontal level of the opposing member with respect to the overlapping surface 30 is adjusted to be disposed within the normal range, thereby welding the entire overlapping surface with uniform welding energy through the anvil and the horn in the state of press-fitting the entire overlapping surface.

Hereinafter, a welding method using the ultrasonic welding device for the secondary battery according to the second embodiment of the present invention will be described.

Figure 7:
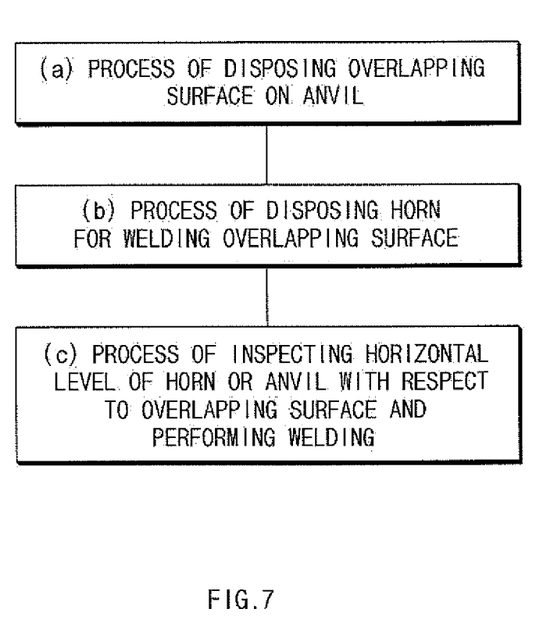
FIG. 7 is a flowchart illustrating an ultrasonic welding method for the secondary battery according to the second embodiment of the present invention.

Ultrasonic Welding Method for Secondary Battery According to Second Embodiment of the Present Invention As illustrated in FIG. 7, an ultrasonic welding method for the secondary battery according to a second embodiment of the present invention is performed to weld an electrode tab 11 and an electrode lead 20, which are provided in an electrode assembly 10 and comprises a process (a) of disposing an overlapping surface on an anvil, a process (b) of disposing a horn for welding the overlapping surface, a process (c) of inspecting a horizontal level; and a welding process.

In the process (a), the overlapping surface 30 of the electrode tab 11 and the electrode lead 20, which are provided in the electrode assembly 10, is disposed on the anvil 110.

Here, the process (a) further comprises a process of measuring a horizontal value of the overlapping surface, which is a horizontal value of the overlapping surface 30 with respect to a predetermined reference surface 40. Here, an overlapping surface measuring member 130 is used.

That is, the overlapping surface measuring member 130 measures the horizontal value of the overlapping surface 30 based on the reference surface 40. Here, the overlapping surface measuring member 130 measures an inclination angle of the overlapping surface 30 in a full-length direction and an inclination angle of the overlapping surface 30 in a full-width direction based on the horizontal value of the overlapping surface.

In the process (b), a horn 120 for welding the overlapping surface 30 disposed on the anvil 110 is disposed.

Here, in the process (b) further comprises a process of measuring an opposing horizontal value that is a horizontal value of an opposing member, which is one of a welding part 121 of the horn 120 facing the overlapping surface 30 and a disposing part 111 of the anvil 110 on which the overlapping surface 30 is disposed, with respect to the reference surface. Here, an opposing measuring member is used, and the opposing measuring member comprises an anvil measuring member 170 and a horn measuring member 140.

The anvil measuring member 170 measures a horizontal value of the disposing part of the anvil 110, on which the overlapping surface is disposed, based on a reference surface. The horn measuring member 140 measures a horizontal value of the welding part of the horn facing the overlapping surface 30, based on the reference surface.

In the process (c), the horizontal level of the opposing member with respect to the overlapping surface 30 is inspected based on the overlapping surface horizontal value, which is the horizontal value of the overlapping surface 30 with respect to the predetermined reference surface 40, and the opposing horizontal value that is the horizontal value of the opposing member, which is one of the welding part 121 of the horn 120 and the disposing part 111 of the anvil, on which the overlapping surface is disposed, with respect to a reference surface. Here, an inspection member 150 is used.

The inspection member 150 compares the horizontal value of the disposing part to the horizontal value of the overlapping surface to determine whether the difference value is within the normal range. As a result, when it is determined that the difference value is out of the normal range, it is determined as being defective, whereas, when it is determined that that difference value is within the normal range, it is determined as being normal. That is, the inspection member 150 may confirm a difference in pressing force applied to the entire overlapping surface through the overlapping surface horizontal value and the disposing part horizontal value, and thus, it may be confirmed in advance that welding defects occur on the overlapping surface 30.

In addition, the inspection member 150 compares the overlapping surface horizontal value to the welding part horizontal value to determine whether the difference value is within the normal range. As a result, when it is determined that the difference value is out of the normal range, it is determined as being defective, whereas, when it is determined that that difference value is within the normal range, it is determined as being normal. That is, the inspection member 150 may confirm a difference in pressing force applied to the entire overlapping surface 30 through the overlapping surface horizontal value and the welding part horizontal value, and thus, it may be confirmed in advance that welding defects occur on the overlapping surface 30.

Here, the process (c) further comprises a process of applying ultrasonic waves to weld the overlapping surface 30 while supporting the welding part 121 of the horn 120 on the overlapping surface 30 when the horizontal level is determined as being within a predetermined normal range.

The predetermined normal range may be less than 0.30°, preferably less than 0.075°.

The process (c) further comprises a process of adjusting an angle of the opposing member by a difference value between the overlapping surface horizontal value and the opposing horizontal value when the horizontal level is determined as being within the predetermined normal range. Here, the angle adjusting member is used, and the angle adjusting member comprises a horn angle adjusting member 160 and an anvil angle adjusting member 180.

That is, the horn angle adjusting member 160 is provided to adjust the horizontal level of the horn and thus adjusts an angle of the welding part of the horn 120 by the difference between the overlapping surface horizontal value and the welding part horizontal value to match the overlapping surface horizontal value with the welding part horizontal value, thereby uniformly applying the entire overlapping surface or uniformly applying the ultrasonic waves to the entire overlapping surface so as to prevent welding defects from occurring.

The anvil angle adjusting member 180 is provided to adjust the horizontal level of the anvil and thus adjusts an angle of the disposing surface of the anvil by the difference value between the disposing part horizontal value of the anvil and the overlapping surface horizontal value. Thus, the disposing part horizontal value of the anvil may be matched with the overlapping surface horizontal value, thereby preventing the welding defects from occurring.

Therefore, in the ultrasonic welding method for the secondary battery according to the second embodiment of the present invention, the entire overlapping surface of the electrode tab and the electrode lead may be uniformly welded, and as a result, the welding quality may be improved.

EXPERIMENTAL EXAMPLE

Experiment Preparation

An electrode tab and an electrode lead are welded using the ultrasonic device 100 for the secondary battery according to the second embodiment of the present invention.

Figure 8:
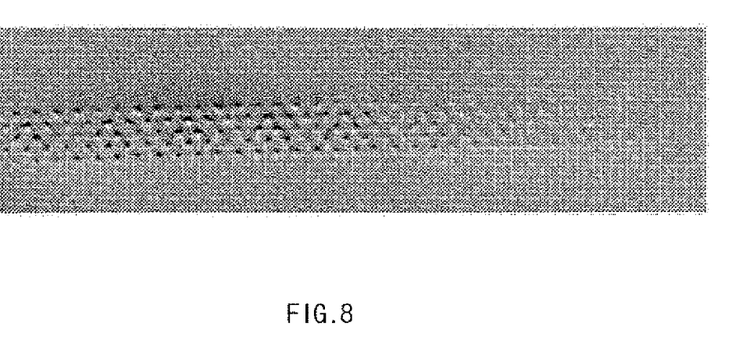
FIGS. 8 to 10 are pictures photographing an overlapping surface welded by the ultrasonic welding device for the secondary battery according to the second embodiment of the present invention.

In Preparation Example 1, when a horizontal level between an anvil 110 and a horn 120 is 0°, an overlapping surface of the electrode tabs and the electrode leads is welded, and then, the welded overlapping surface is photographed. Then, a picture as shown in FIG. 8 may be obtained. Here, a unit area ($mm^2$) of the welded overlapping surface has a length of 44 mm and a width of 3 mm.

Figure 9:
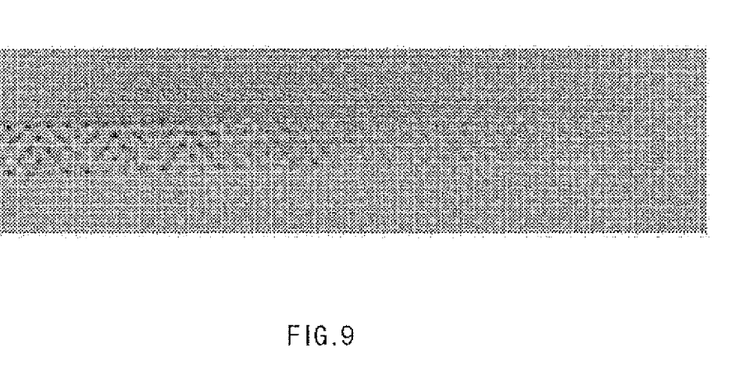

In Preparation Example 2, when a difference in horizontal level between the anvil 110 and the horn 120 is 0.075°, the overlapping surface of the electrode tab and the electrode lead is welded, and then, the welded overlapping surface is photographed. Then, a picture as shown in FIG. 9 may be obtained. Here, a unit area ($mm^2$) of the welded overlapping surface has a length of 44 mm and a width of 3 mm.

Figure 10:
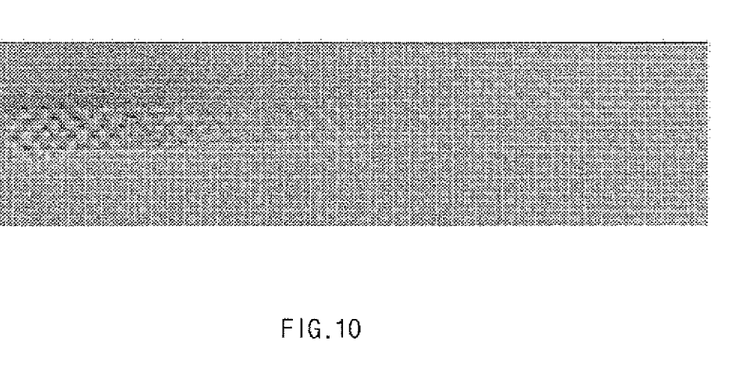

In Preparation Example 3, when a difference in horizontal level between the anvil 110 and the horn 120 is 0.15°, the overlapping surface of the electrode tab and the electrode lead is welded, and then, the welded overlapping surface is photographed. Then, a picture as shown in FIG. 10 may be obtained. Here, a unit area ($mm^2$) of the welded overlapping surface has a length of 44 mm and a width of 3 mm.

Here, the electrode tab comprises a negative electrode tab and a positive electrode tab, and the electrode lead comprises a negative electrode lead and a positive electrode lead. That is, the welded state of the negative electrode tab and the negative electrode lead and the welded state of the positive electrode tab and the positive electrode lead are tested respectively.

Welding Result

Referring to FIG. 8 in Preparation Example 1, it is seen that the entire overlapping surface of the electrode tab and the electrode lead is uniformly welded.

Referring to FIG. 9, in Preparation Example 2, it is seen that welding defects occur at a portion of a right side of the entire overlapping surface of the electrode tab and the electrode lead. That is, it is confirmed that the welding defects occur in a spaced portion between the anvil and the horn.

Referring to FIG. 10, in Preparation Example 3, it is seen that welding defects occur at about half of the entire overlapping surface of the electrode tab and the electrode lead. That is, it is seen that the welding defects occur as about half of the anvil and the horn is not pressed.

Therefore, in the ultrasonic device 100 for the secondary battery according to the second embodiment of the present invention, as in Preparation Example 1, when welding the overlapping surfaces of the electrode tab and the electrode lead, the horizontal levels of the anvil and the horn are adjusted to be the same to uniformly weld the entire overlapping surface of the electrode tab and the electrode lead, thereby improving the welding quality.

Tensile Strength Test

Figure 11:
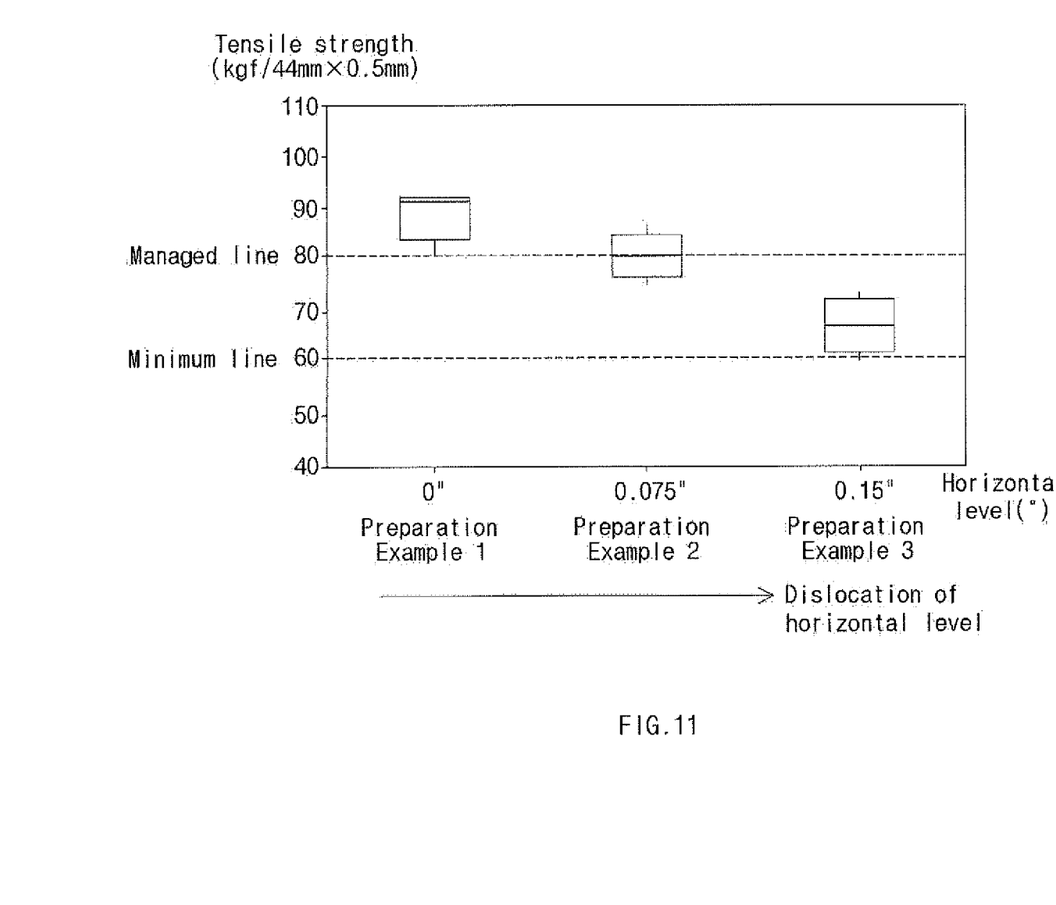
FIG. 11 is a graph illustrating results obtained by measuring tensile strengths of a negative electrode tab and a negative electrode lead, which are welded by the ultrasonic welding device for the secondary battery according to the second embodiment of the present invention.

As the result of measuring the tensile strength of the overlapping surface of the negative electrode tab and the negative electrode lead, which are welded in Preparation Examples 1 to 3, a graph as shown in FIG. 11 may be obtained.

Figure 12:
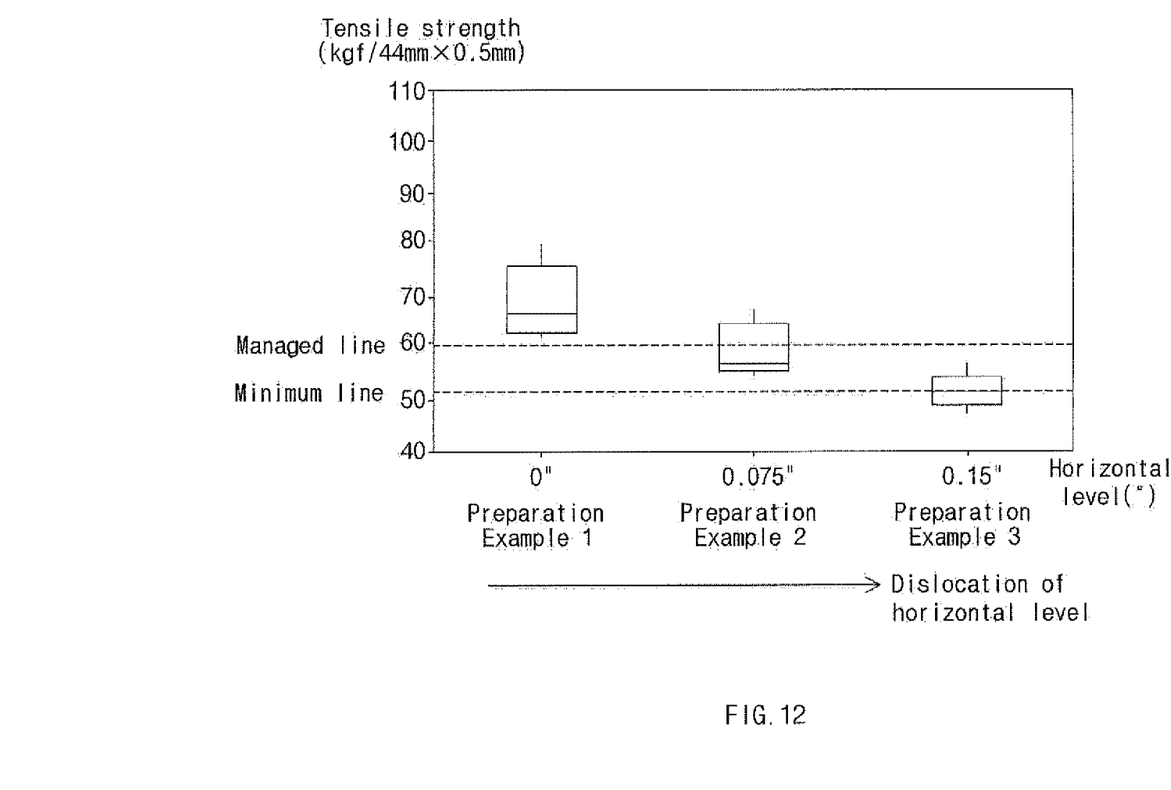
FIG. 12 is a graph illustrating results obtained by measuring tensile strengths of a positive electrode tab and a positive electrode lead, which are welded by the ultrasonic welding device for the secondary battery according to the second embodiment of the present invention.

As the result of measuring the tensile strength of the overlapping surface of the positive electrode tab and the positive electrode lead, which are welded in Preparation Examples 1 to 3, a graph as shown in FIG. 12 may be obtained.

Here, managed tensile strength of the negative electrode is set to 80 kgf. Also, managed tensile strength of the positive electrode is set to 60 kgf. In addition, a unit area ($mm^2$) of each of the overlapping surface of the welded negative electrode tab and negative electrode lead and a unit area ($mm^2$) of the overlapping surface of the welded positive electrode tab and positive electrode lead is provided with a length of 44 mm, a width of 3 mm, and a thickness of 0.5 mm.

Result of Tensile Strength Test

As the test result of the overlapping surface of the welded negative electrode tab and negative electrode lead, referring to FIG. 11, in Preparation Example 1, it is confirmed as normal welding because the measured tensile strength is greater than the managed tensile strength. In addition, in Preparation Example 2, it is confirmed as normal welding because the measured tensile strength corresponds to the managed tensile strength, and in Preparation Example 3, it is confirmed as defective welding because the measured tensile strength is less than the managed tensile strength.

As the test result of the overlapping surface of the welded positive electrode tab and positive electrode lead, referring to FIG. 12, in Preparation Example 1, it is confirmed as normal welding because the measured tensile strength is measured to be greater than the managed tensile strength. In addition, in Preparation Example 2, it is confirmed as normal welding because the measured tensile strength corresponds to the managed tensile strength, and in Preparation Example 3, it is confirmed as defective welding because the measured tensile strength is measured to be less than the managed tensile strength.

Therefore, as the result of measuring the tensile strength in Preparation Examples 1 to 3, it is necessary to manage the horizontal level of each of the anvil and the horn to less than 0.075°, and if managed as described above, the welding quality of the electrode tab and the electrode lead may be maintained.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Ultrasonic welding device
110: Anvil

120: Horn
130: Overlapping surface measuring member
140: Horn measuring member
150: Inspection member
160: Horn angle adjusting member
170: Anvil measuring member
180: Anvil angle adjusting member

The invention claimed is:

1. An ultrasonic welding device comprising:
   an anvil provided so that an overlapping surface of an electrode tab and an electrode lead, which are provided in an electrode assembly, are configured to be disposed thereon;
   a horn configured to weld the overlapping surface disposed on the anvil; and
   an inspection member configured to inspect a horizontal level of an opposing member with respect to the overlapping surface, based on an overlapping surface horizontal value that is a horizontal value of the overlapping surface with respect to a predetermined reference surface and an opposing horizontal value that is a horizontal value of the opposing member, which is one of a welding part of the horn configured to face the overlapping surface and a disposing part of the anvil, on which the overlapping surface is configured to be disposed, with respect to the predetermined reference surface.

2. The ultrasonic welding device of claim 1, wherein, when the horizontal level is determined as being within a predetermined range by the inspection member, the horn is provided to apply ultrasonic waves to the overlapping surface while supporting the welding part of the horn on the overlapping surface.

3. The ultrasonic welding device of claim 1, further comprising:
   an overlapping surface measuring member configured to measure the overlapping surface horizontal value; and
   an opposing measuring member configured to measure the opposing horizontal value.

4. The ultrasonic welding device of claim 1, further comprising an angle adjusting member configured to adjust an angle of the opposing member by a difference value between the overlapping surface horizontal value and the opposing horizontal value.

5. The ultrasonic welding device of claim 4, wherein the angle adjusting member is configured to adjust the angle of the opposing member by the difference value between the overlapping surface horizontal value and the opposing horizontal value when the inspection member determines that the horizontal level is outside of the predetermined range.

6. The ultrasonic welding device of claim 1, wherein the overlapping surface horizontal value comprises an inclination angle of the overlapping surface in a full-length direction and an inclination angle of the overlapping surface in a full-width direction in a state in which the predetermined reference surface is set to an angle of 0°,
   the opposing horizontal value comprises an inclination angle of the opposing member in a full-length direction and an inclination angle of the opposing member in a full-width direction in a state in which the predetermined reference surface is set to an angle of 0°, and
   the inspection member is provided to compare the inclination angle of the overlapping surface in the full-length direction to the inclination angle of the opposing member in the full-length direction and compare the inclination angle of the overlapping surface in the full-width direction to the inclination angle of the opposing member in the full-width direction.

7. The ultrasonic welding device of claim 2, wherein the predetermined range is angles of 0° to 0.30°.

* * * * *